(12) United States Patent
Yoo et al.

(10) Patent No.: US 11,038,183 B2
(45) Date of Patent: Jun. 15, 2021

(54) APPARATUS FOR MANUFACTURING ELASTOMERIC CELL FRAME FOR FUEL CELL

(71) Applicants: Hyundai Motor Company, Seoul (KR); Kia Motors Corporation, Seoul (KR)

(72) Inventors: Jin Hyeok Yoo, Cheonan-si (KR); Byung Gun Song, Gwangju-si (KR); Byeong-Heon Jeong, Seoul (KR)

(73) Assignees: Hyundai Motor Gompany, Seoul (KR); Kia Corporation, Seoul (KR)

( * ) Notice: Subject to any disclaimer, the term of this patent is extended or adjusted under 35 U.S.C. 154(b) by 6 days.

(21) Appl. No.: 16/688,832

(22) Filed: Nov. 19, 2019

(65) Prior Publication Data

US 2021/0020963 A1    Jan. 21, 2021

(30) Foreign Application Priority Data

Jul. 15, 2019    (KR) ........................ 10-2019-0085121

(51) Int. Cl.
*H01M 8/00*        (2016.01)
*H01M 8/0273*      (2016.01)
*H01M 4/88*        (2006.01)

(52) U.S. Cl.
CPC ....... *H01M 8/0273* (2013.01); *H01M 4/8807* (2013.01); *H01M 4/8882* (2013.01); *H01M 4/8896* (2013.01)

(58) Field of Classification Search
CPC ................................. H01M 4/02; H01M 8/00
See application file for complete search history.

(56) References Cited

U.S. PATENT DOCUMENTS

2003/0211378 A1*  11/2003  Wald .................. H01M 8/0271
                                                    429/483

FOREIGN PATENT DOCUMENTS

| CN | 209056561 | * | 7/2019 |
| JP | 2017-126457 | * | 7/2017 |
| KR | 10-0957305 B1 | | 5/2010 |
| KR | 20-0466802 Y1 | | 5/2013 |
| KR | 10-1282618 B1 | | 7/2013 |
| KR | 10-1304700 B1 | | 8/2013 |
| KR | 20-0478989 Y1 | | 12/2015 |

* cited by examiner

*Primary Examiner* — Jacob B Marks
(74) *Attorney, Agent, or Firm* — Morgan, Lewis & Bockius LLP (57) ABSTRACT

An apparatus of manufacturing an elastomeric cell frame for a fuel cell may include, as the apparatus of manufacturing the elastomeric cell frame including an insert in which a membrane electrode assembly and a gas diffusion layer have been bonded, and a sheet-like elastomeric frame made of a thermoplastic elastomer (TPE) integrated into an external area of the insert to form the unit cell of the fuel cell, a lower jig module accommodated so that the overlapping area, in which the insert and the elastomeric frame overlap at a predetermined area, is accommodated, and an upper jig module mounted above the lower jig module to provide heat and pressure to the overlapping area to thermally bond an interface between the insert and the elastomeric frame in the overlapping area.

19 Claims, 6 Drawing Sheets

APPARATUS FOR MANUFACTURING ELASTOMERIC CELL FRAME FOR FUEL CELL

CROSS REFERENCE TO RELATED APPLICATION

The present application claims priority to Korean Patent Application No. 10-2019-0085121 filed on Jul. 15, 2019, the entire contents of which is incorporated herein for all purposes by this reference.

BACKGROUND OF THE PRESENT INVENTION

Field of the Invention

The present invention relates to an apparatus for manufacturing an elastomeric cell frame for a fuel cell, and more particularly, an apparatus configured for manufacturing an elastomeric cell frame for a fuel cell, which integrally bonds a sheet-shaped elastomeric frame made of a thermoplastic elastomer (TPE) to an insert in which a membrane electrode assembly and a gas diffusion layer have been bonded without a separate adhesive member.

Description of Related Art

A fuel cell is a type of power generation device configured for electrochemically reacting the chemical energy of fuel in a stack to convert it into electrical energy, is used to supply not only the driving power of industrial, household, and vehicle but also supply power of small electronic products such as a portable device, and recently, its use area is gradually expanding as the clean energy source of high efficiency.

A unit cell of a general fuel cell has a Membrane Electrode Assembly (MEA) mounted at the innermost portion thereof, and the membrane electrode assembly is composed of a polymer electrolyte membrane capable of transferring hydrogen proton, and a catalyst layer, that is, a cathode and an anode applied on both surfaces of the polymer electrolyte membrane so that hydrogen and oxygen may react with each other.

Furthermore, a pair of separator plates for supplying a reactant gas and discharging the generated water generated by the reaction is mounted on one surface and the other surface of the membrane electrode assembly, that is, on the external portion where the cathode and the anode are mounted. At the instant time, a Gas Diffusion Layer (GDL) for diffusing or smoothing the flow of the reactant gas and the generated water may be located between the membrane electrode assembly and the separator plate.

Meanwhile, a Membrane-Electrode-Gasket Assembly (MEGA) for integrating the membrane electrode assembly and a gasket has been conventionally manufactured and used for keeping the airtightness of the unit cell and the convenience in a stacking process as well.

Furthermore, recently, an integrated frame for integrating an insert having the gas diffusion layer bonded to the membrane electrode assembly and the gasket has also been provided.

However, the conventional integrated frame has bonded the frame and the insert of a plastic material by use of an adhesive agent. Furthermore, when manufacturing the unit cell by use of the conventional integrated frame, an adhesive member and a sealing member have been separately required for adhering the separator plate and the integrated frame. This process has caused an increase in the material cost and the manufacturing cost.

Furthermore, conventionally, a pair of separator plates facing each other has been bonded in advance and then used in the stacking process to align the separator plates facing each other in the unit cells adjacent to each other when stacking the unit cell.

Accordingly, the applicant has conducted a study of integrating the gasket with the insert by replacing the sheet-shaped elastomeric frame made of a thermoplastic elastomer (TPE), and accordingly, an apparatus configured for thermal bonding by simultaneously providing heat and pressure to the elastomeric frame and the insert has been required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of manufacturing an elastomeric cell frame for a fuel cell, which may integrally bond the insert and the elastomeric frame without a separate adhesive member by simultaneously providing heat and pressure to an overlapping area between the insert and the elastomeric frame.

An apparatus of manufacturing an elastomeric cell frame for a fuel cell according to an exemplary embodiment of the present invention includes, as the apparatus of manufacturing the elastomeric cell frame including an insert in which a membrane electrode assembly and a gas diffusion layer have been bonded, and a sheet-like elastomeric frame made of a thermoplastic elastomer (TPE) integrated into an external area of the insert to form the unit cell of the fuel cell, a lower jig module accommodated so that the overlapping area, in which the insert and the elastomeric frame overlap at a predetermined area, is accommodated, and an upper jig module mounted above the lower jig module to provide heat and pressure to the overlapping area to thermally bond an interface between the insert and the elastomeric frame in the overlapping area.

The upper jig module includes a moving shaft moving forwards from or backwards toward the lower jig module, an upper jig mounted at one end portion of the moving shaft to provide the heat and the pressure while facing the overlapping area, and a power portion mounted at the other end portion of the moving shaft to provide power to forward or backward operation of the moving shaft.

The overlapping area includes a short-axis overlapping area formed on a short-axis portion of the elastomeric frame, and a long-axis overlapping area formed on a long-axis portion of the elastomeric frame, the upper jig includes a first upper jig for providing heat and pressure to the short-axis overlapping area, and a second upper jig for providing heat and pressure to the long-axis overlapping area, and the moving shaft includes a first moving shaft coupled to the first upper jig for moving the first upper jig, and a second moving shaft coupled to the second upper jig for moving the second upper jig.

The first upper jig includes a first main body portion connected to the first moving shaft, and a first heating portion protruded toward the lower jig module on a surface of the first main body portion to provide heat and pressure while directly facing the short-axis overlapping area, and the second upper jig includes a second main body portion connected to the second moving shaft, and a second heating portion protruded toward the lower jig module on a surface of the second main body portion to provide heat and pressure while directly facing the long-axis overlapping area.

The first moving shaft is formed in a pipe having a hollow formed at both end portions thereof, and the second moving shaft is slidably mounted by penetrating an interior of the first moving shaft, and the second main body portion of the second upper jig is mounted further toward the lower jig module than the first main body portion of the first upper jig, and the first heating portion of the first upper jig protrudes further toward the lower jig module than the second heating portion of the second upper jig.

The first heating portion and the second heating portion are made of a material having a thermal conductivity higher than a thermal conductivity of the first main body portion and the second main body portion.

The power portion independently operates whether to move the first moving shaft and the second moving shaft and the movement amounts thereof, respectively.

The apparatus of manufacturing the elastomeric cell frame for the fuel cell further includes a base plate in which the lower jig module is accommodated, and a support module mounted on the base plate to support so that the upper jig module is mounted above the lower jig module.

The first upper jig includes a first non-contact portion formed so that the first heating portion does not directly contact with the elastomeric frame in the remaining areas except for the short-axis overlapping area.

The second upper jig includes a second non-contact portion formed so that the second heating portion does not directly contact with the elastomeric frame in the remaining areas except for the long-axis overlapping area.

The first upper jig includes a first contact portion formed so that the first heating portion directly contacts with the elastomeric frame in the remaining areas except for the short-axis overlapping area, The second upper jig includes a second contact portion formed so that the second heating portion directly contacts with the elastomeric frame in the remaining areas except for the long-axis overlapping area.

According to an exemplary embodiment of the present invention, it is possible to easily align and thermally bond the insert in which the membrane electrode assembly and the gas diffusion layer have been bonded, and the sheet-like elastomeric frame made of the thermoplastic elastomer (TPE) integrated into the external area of the insert.

Furthermore, it is possible to divide the overlapping area between the insert and the elastomeric frame by area, and divide the upper jig module to correspond to each area to variously control the heat and pressure condition provided for each area, enhancing the quality of the elastomeric cell frame.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in more detail with reference to the accompanying drawings. However, the present invention is not limited to the exemplary embodiments included below but may be implemented in various forms differently from each other and rather, these embodiments are provided so that the present invention will be thorough and complete and to completely convey the scope of the present invention to those skilled in the art. The same reference numerals refer to the same elements in the drawings.

Figure 1:
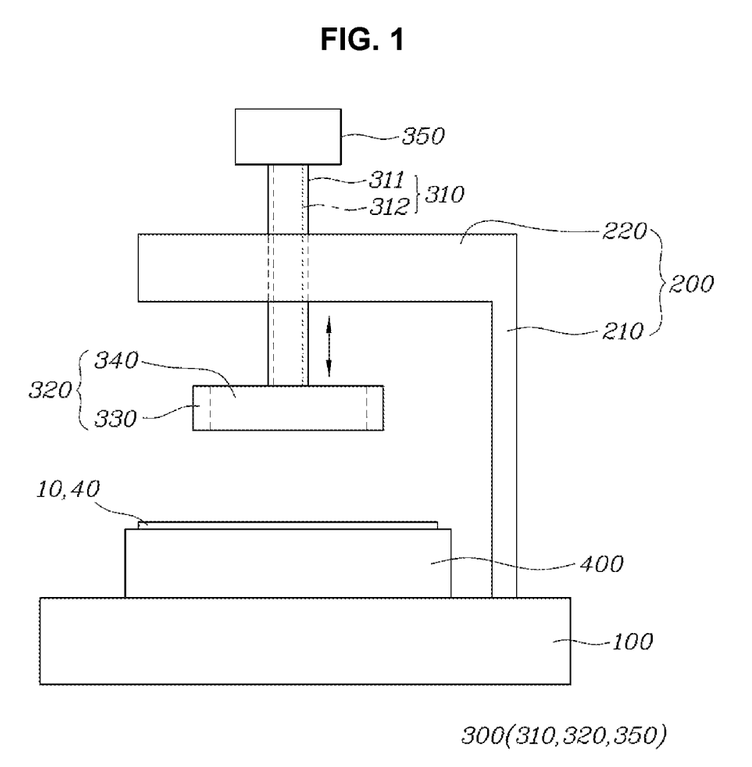
FIG. 1 is a side diagram showing an apparatus of manufacturing an elastomeric cell frame for a fuel cell according to an exemplary embodiment of the present invention.
Figure 2:
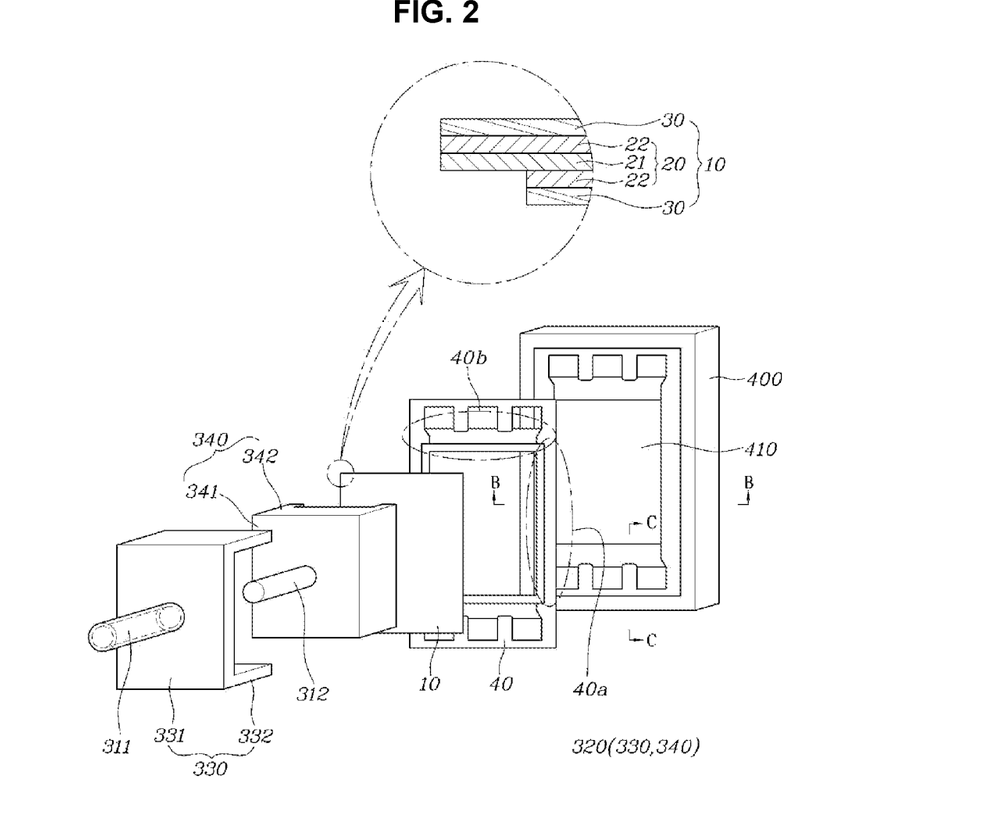
FIG. 2 is an exploded perspective diagram showing the main portion of the apparatus of manufacturing elastomeric cell frame for the fuel cell according to an exemplary embodiment of the present invention.
Figure 3:
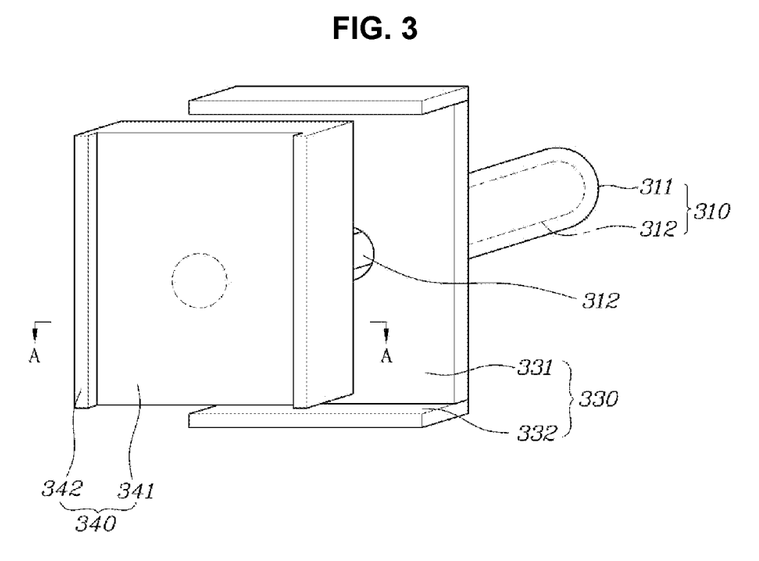
FIG. 3 is a perspective diagram showing the main portion of an upper jig module according to an exemplary embodiment of the present invention.
Figure 4:
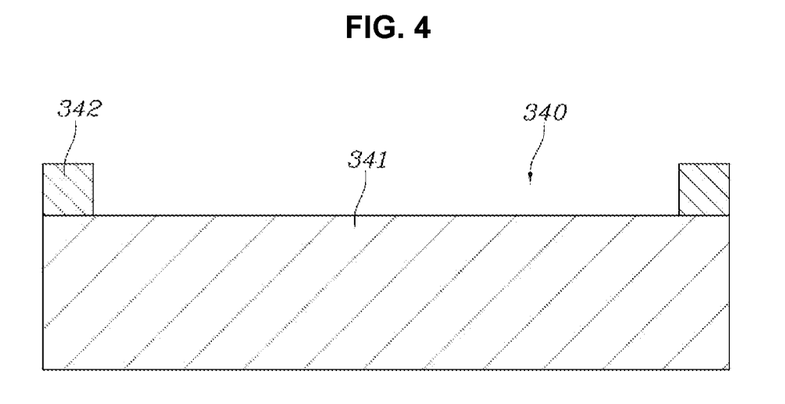
FIG. 4, FIG. 5A, and FIG. 5B are cross-sectional diagrams showing section of the main portion according to an exemplary embodiment of the present invention.
Figure 5A:
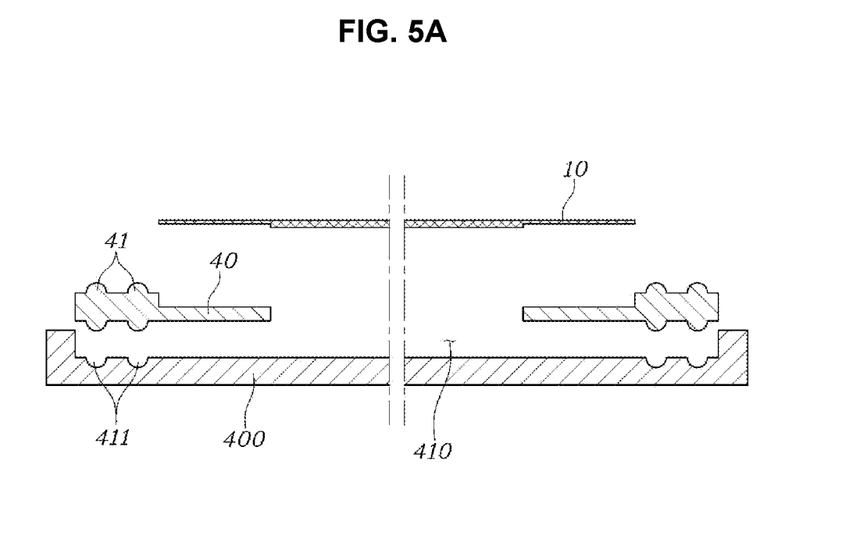
Figure 5B:
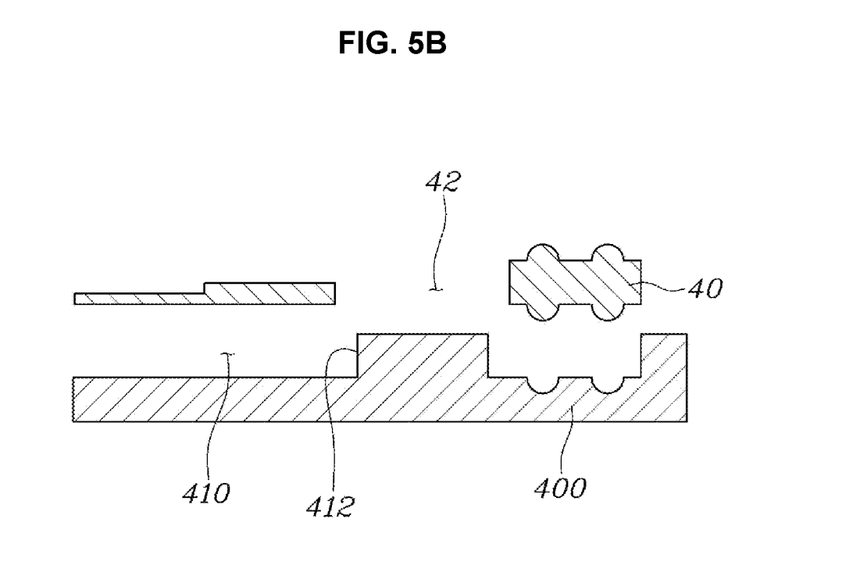

FIG. 1 is a side diagram showing an apparatus of manufacturing an elastomeric cell frame for a fuel cell according to an exemplary embodiment of the present invention, FIG. 2 is an exploded perspective diagram showing the main portion of the apparatus of manufacturing elastomeric cell frame for the fuel cell according to an exemplary embodiment of the present invention, FIG. 3 is a perspective diagram showing the main portion of an upper jig module according to an exemplary embodiment of the present invention, FIGS. 4, 5A, and 5B are cross-sectional diagrams showing section of the main portion according to an exemplary embodiment of the present invention, and FIGS. 6A to 7B are cross-sectional diagrams showing the main portion of the section of a heating portion according to various embodiments of the present invention.

At the present time, FIG. 4 is a cross-sectional diagram taken along the line A-A of FIG. 3, FIG. 5A is a cross-sectional diagram taken along the line B-B of FIG. 2, and FIG. 5B is a cross-sectional diagram taken along the line C-C of FIG. 2.

As shown in the drawings, an apparatus of manufacturing an elastomeric cell frame for a fuel cell according to an exemplary embodiment of the present invention is an apparatus of manufacturing an elastomeric cell frame including an insert 10 in which a membrane electrode assembly 20 and a gas diffusion layer 30 have been bonded, and a sheet-like elastomeric frame 40 made of a thermoplastic elastomer (TPE) integrated into an external area of the insert 10 to form the unit cell of the fuel cell, and largely divided into a base plate 100, a support module 200, an upper jig module 300, and a lower jig module 400.

First, the insert 10 and the elastomeric frame 40 forming the elastomeric cell frame manufactured by use of the present invention will be described.

The insert 10 is an assembly in which the membrane electrode assembly 20 and a pair of gas diffusion layers 30 have been stacked, and the gas diffusion layer 30 is mounted and stacked on one surface and the other surface of the membrane electrode assembly 20, respectively.

The membrane electrode assembly 20 is implemented by a polymer electrolyte membrane 21 configured for moving hydrogen proton, and an electrode layer 22 coated with a catalyst so that hydrogen and oxygen may react on both surfaces of the polymer electrolyte membrane, that is, a general membrane electrode assembly composed of a cathode and an anode. Accordingly, the membrane electrode assembly 20 according to the exemplary embodiment has a pair of electrode layers 22 formed on both surfaces of the polymer electrolyte membrane 21.

The gas diffusion layer 30 is for passing through while diffusing the reaction gas flowing through a separator plate to the membrane electrode assembly 20, and composed of a substrate alone or a substrate and a micro porous layer (MPL) formed on one surface of the substrate. At the instant time, the material of the substrate and the micro porous layer is implemented by a material applied to the general gas diffusion layer.

Meanwhile, the insert 10 is configured so that the polymer electrolyte membrane 21 and the electrode layer 22, in which thermal bonding with the elastomeric frame 40 is relatively easier than the gas diffusion layer 30, directly face each other to be easily bonded by the thermal bonding with the elastomeric frame 40.

For the present purpose, as shown in FIG. 2, the lengths of the electrode layer 22 and the gas diffusion layer 30 sequentially formed on both surfaces of the polymer electrolyte membrane 21 may be variously applied. For example, the lengths of the electrode layer 22 and the gas diffusion layer 30 formed on one surface of the polymer electrolyte membrane 21 and the lengths of the electrode layer 22 and the gas diffusion layer 30 formed on the other surface thereof may be formed differently from each other. Accordingly, the side surface and one surface edge portion of the polymer electrolyte membrane 21 may be exposed, and the side surface and one surface edge portion of the electrode layer 22 may also be exposed. Of course, the length and formation of the polymer electrolyte membrane 21, the electrode layer 22, and the gas diffusion layer 30 forming the insert 10 are not limited to a specific length and shape and may be implemented by variously changing it for thermal bonding with the elastomeric frame 40.

The elastomeric frame 40 is a means integrally formed in the external area of the insert 10 for the airtightness and stacking process of the insert 10, and the elastomeric frame 40 is formed in a sheet by use of a thermoplastic elastomer (TPE) for bonding by the thermal bonding without a separate adhesive member while maintaining a predetermined shape.

Meanwhile, the insert 10 and the elastomeric frame 40 have an overlapping area superimposed in a predetermined area. The elastomeric frame 40 is mounted to surround the edge portion of the insert 10 in the external area of the insert 10. Accordingly, the overlapping area is formed in the external circumferential area of the insert 10 and the internal circumferential area of the elastomeric frame.

As shown in FIGS. 2, 5A, and 5B, the elastomeric frame 40 has a through hole 42, which corresponds to a plurality of inlet manifolds and outlet manifolds formed on the separator plate forming the unit cell of the fuel cell, formed in both end portions based on the longitudinal direction thereof, and has a sealing protrusion 41 for sealing formed in an area surrounding the reaction surface on which the insert 10 is mounted.

Accordingly, a diffusion portion is formed between the through hole 42 and the reaction surface area in which the insert 10 is mounted on both end portions thereof based on the longitudinal direction of the elastomeric frame 40, and the sealing portion is formed on both end portions thereof based on the width direction of the elastomeric frame 40. Accordingly, the overlapping area formed in the elastomeric frame 40 includes an area corresponding to the diffusion portion of the elastomeric frame 40, that is, a short-axis overlapping area 40b formed on the short-axis portion of the elastomeric frame 40, and an area corresponding to the sealing portion of the elastomeric frame 40, that is, a long-axis overlapping area 40a formed on the long-axis portion of the elastomeric frame 40.

The apparatus of manufacturing the elastomeric cell frame for the fuel cell according to an exemplary embodiment of the present invention for integrating by thermally bonding the insert 10 and the elastomeric frame 40 configured as described above further includes a lower jig module 400 accommodated so that the overlapping area where the insert 10 and the elastomeric frame 40 are superimposed at the predetermined area is formed; an upper jig module 300 mounted on the upper portion of the lower jig module 400 and for thermally bonding the interface between the insert 10 and the elastomeric frame 40 in the overlapping area by providing heat and pressure to the overlapping area. Furthermore, the apparatus of manufacturing the elastomeric cell frame for the fuel cell according to an exemplary embodiment of the present invention further includes the base plate 100 on which the lower jig module 400 is accommodated; and the support module 200 mounted on the base plate 100 to support so that the upper jig module 300 is mounted above the lower jig module 400.

The base plate 100 is configured as a base on which the support module 200 for supporting the upper jig module 300 together with the lower jig module 400 is mounted. The base plate 100 is not limited to a specific shape or form, and may be implemented by variously changing so that the lower jig module 400 and the support module 200 may be stably accommodated and mounted. In an exemplary embodiment of the present invention, the base plate is implemented by a plate having a flat surface formed at the top.

The support module 200 is a module for supporting the upper jig module 300 may be mounted above the lower jig module 400, and divided into a vertical support 210 vertically upright from the base plate 100, and a horizontal support 220 extending in parallel with the base plate 100. Accordingly, the upper jig module 300 is supported by the horizontal support 220. of course, the support module 200 is not divided into the vertical support 210 and the horizontal support 220 and may be formed integrally with the vertical support 210 and the horizontal support 220. Furthermore, the present invention is not limited to the cantilever shape formed of the vertical support 210 and the horizontal support 220 and may be implemented in various forms which may dispose while stably supporting the upper jig module 300 above the lower jig module 400.

The upper jig module 300 is a module for thermally bonding the interface between the insert 10 and the elastomeric frame 40 by simultaneously providing heat and pressure to the overlapping area between the insert 10 and the elastomeric frame 40 accommodated on the lower jig module 400, and includes a moving shaft 310 which is moved forwards or backwards toward the lower jig module 400; an upper jig 320 mounted at one end portion of the moving shaft 310 to provide the heat and the pressure while facing the overlapping area; and a power portion 350 mounted at the other end portion of the moving shaft 310 to provide power to forward or backward operation of the moving shaft 310.

The moving shaft 310 is a means which is moved to move forwards or backwards toward the lower jig module 400 by the power provided from the power portion 350, and the operation method thereof may be implemented by variously changing it according to various forms of the power portion 350. The exemplary embodiment of the present invention is implemented in a form of a rod which is moved forwards or backwards by an operation of a motor forming the power portion 350.

The upper jig 320 is mounted at the end portion of the moving shaft 310 to move forwards toward the lower jig module 400 together by the forward or backward movement of the moving shaft 310 to provide pressure to the overlapping area between the insert 10 and the elastomeric frame 40. Furthermore, the upper jig 320 is heated by a heating means to provide heat together while providing pressure to the overlapping area between the insert 10 and the elastomeric frame 40.

The power portion 350 is for providing power to move the moving shaft 310 forwards or backwards, and may be implemented in various manners configured for operating the moving shaft 310. The exemplary embodiment includes the motor configured for operating the moving shaft 310 forwards or backwards to control the forward or backward level of the moving shaft 310 according to whether to operate the motor and a control of the operation amount thereof, such that the upper jig 320 adjusts the pressure that presses the overlapping area between the insert 10 and the elastomeric frame 40 accommodated in the lower jig module 400.

Meanwhile, in an exemplary embodiment of the present invention, the overlapping area between the insert 10 and the elastomeric frame 40 includes the short-axis overlapping area 40b and the long-axis overlapping area 40a, and at the present time, the upper jig module 300 is provided to separately provide heat and pressure to the short-axis overlapping area 40b and the long-axis overlapping area 40a, respectively.

For example, as shown in FIG. 3, the upper jig 320 provides a first upper jig 330 for providing heat and pressure to the short-axis overlapping area 40b, and a second upper jig 340 for providing heat and pressure to the long-axis overlapping area 40a. Furthermore, the moving shaft 310 includes a first moving shaft 311 for moving the first upper jig 330 and a second moving shaft 312 for moving the second upper jig 340. At the instant time, the first moving shaft 311 is formed in a pipe having a hollow formed at both end portions thereof, the second moving shaft 312 is mounted by penetrating an interior of the first moving shaft 311 so that the first moving shaft 311 and the second moving shaft 312 are separately moved forwards or backwards, respectively.

Accordingly, the power portion 350 may move the first moving shaft 311 to provide heat and pressure to the short-axis overlapping area 40b by the first upper jig 330, and the power portion 350 may move the second moving shaft 312 to provide heat and pressure to the long-axis overlapping area 40a by the second upper jig 340, separately. Accordingly, the power portion 350 independently operates whether to move the first moving shaft 311 and the second moving shaft 312 and the movement amounts thereof. For the present purpose, the power portion 350 is provided with the motor configured for operating the first moving shaft 311 and the motor configured for operating the second moving shaft 312, respectively.

Furthermore, the first upper jig 330 and the second upper jig 340 locally provide heat and pressure to the short-axis overlapping area 40b and the long-axis overlapping area 40a, respectively. For the present purpose, as shown in FIG. 3 and FIG. 4, the first upper jig 330 includes a first main body portion 331 connected to the first moving shaft 311 and a first heating portion 332 protruded toward the lower jig module 400 on the surface of the first main body portion 331 to provide heat and pressure while directly facing the short-axis overlapping area 40b. Furthermore, the second upper jig 340 includes a second main body portion 341 connected to the second moving shaft 312, and a second heating portion 342 protruded toward the lower jig module 400 on the surface of the second main body portion 341 to provide heat and pressure while directly facing the long-axis overlapping area 40a.

At the present time, since the first moving shaft 311 and the second moving shaft 312 are formed of a double pipe structure, the first upper jig 330 and the second upper jig 340 are mounted to overlap each other. Accordingly, the second main body 341 of the second upper jig 340 is mounted further toward the lower jig module 400 than the first main body 331 of the first upper jig 330 and thus the first main body 331, such that the first main body portion 331 and the second main body portion 341 are mounted in a form of overlapping each other. However, the first heating portion 332 of the first upper jig 330 protrudes further toward the lower jig module 400 than the second heating portion 342 of the second upper jig 340. Accordingly, the first moving shaft 311 and the second moving shaft 312 separately operate forwards or backwards, respectively, so as not to interfere the operation in which the first heating portion 332 and the second heating portion 342 provide heat and pressure to the short-axis overlapping area 40b and the long-axis overlapping area 40a, respectively.

Of course, the configuration manner of the first moving shaft 311 and the first upper jig 330, and the second moving shaft 312 and the second upper jig 340 is not limited to the included embodiment but may be implemented by changing it in various manners to separately provide heat and pressure to the short-axis overlapping area 40b and the long-axis overlapping area 40a, respectively.

Meanwhile, since the first heating portion 332 and the second heating portion 342 directly provide heat and pressure to the short-axis overlapping area 40b and the long-axis overlapping area 40a, and preferably do not provide heat and pressure to other areas other than the short-axis overlapping area 40b and the long-axis overlapping area 40a, the first main body portion 331 and the second main body portion 341 have low thermal conductivity. Accordingly, the first heating portion 332 and the second heating portion 342 are made of a material having a higher thermal conductivity than the first body portion 331 and the second body portion 341.

Furthermore, the short-axis overlapping area 40b and the long-axis overlapping area 40a may have different thicknesses, and at the present time, the first heating portion 332 and the second heating portion 342 may change the shape of the surface facing the short-axis overlapping area 40b and the long-axis overlapping area 40a to provide the same surface pressure to the thicknesses different from each other.

Figure 6A:
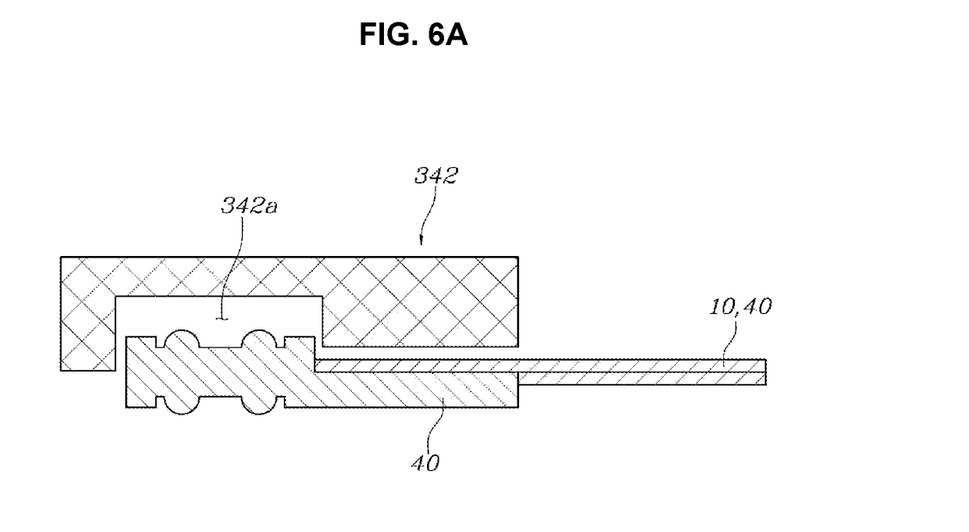
FIG. 6A, FIG. 6B, FIG. 7A and FIG. 7B are cross-sectional diagrams showing the main portion of the section of a heating portion according to various embodiments of the present invention.

For example, as shown in FIG. 6A, a second non-contact portion 342a may be formed so that the second heating portion 342 does not directly contact with the elastomeric frame 40 in the remaining areas except for the long-axis overlapping area 40a when the second heating portion 342 provides heat and pressure to the long-axis overlapping area 40a to detect the surface pressure pressed to the long-axis overlapping area 40a by measuring the compression displacement of the elastomeric frame 40 when the second heating portion 342 presses the long-axis overlapping area 40a.

Figure 6B:
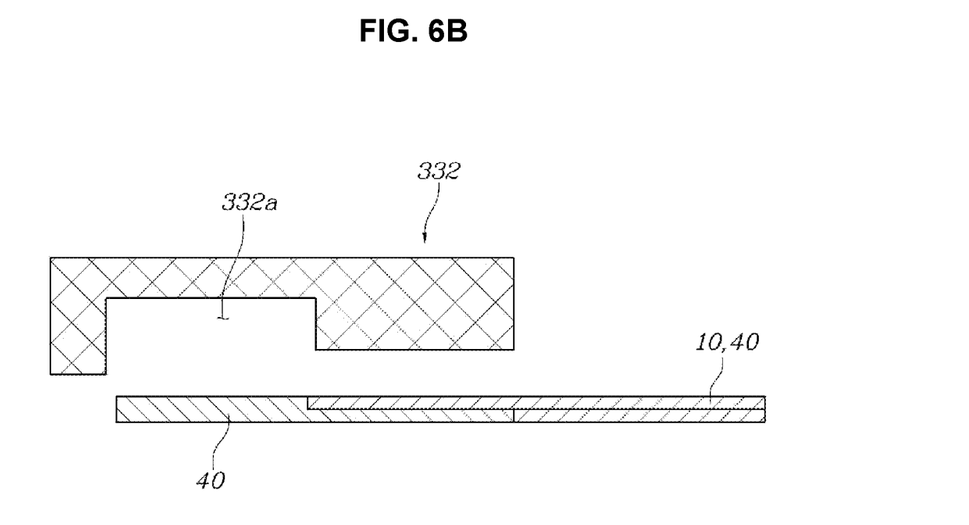

Furthermore, as shown in FIG. 6B, a first non-contact portion 332a may be formed so that the first heating portion 332 does not directly contact with the elastomeric frame 40 in the remaining areas except for the short-axis overlapping area 40b when the first heating portion 332 provides heat and pressure to the short-axis overlapping area 40b to detect the surface pressure pressed to the short-axis overlapping area 40b by measuring the compression displacement of the elastomeric frame 40 when the first heating portion 332 presses the short-axis overlapping area 40b.

Accordingly, the surface pressure pressed to the long-axis overlapping area 40a and the surface pressure pressed to the short-axis overlapping area 40b may be compared to control the movement amounts of the second moving shaft 312 and the first moving shaft 311, respectively so that the same surface pressure as each other is provided thereto.

Figure 7A:
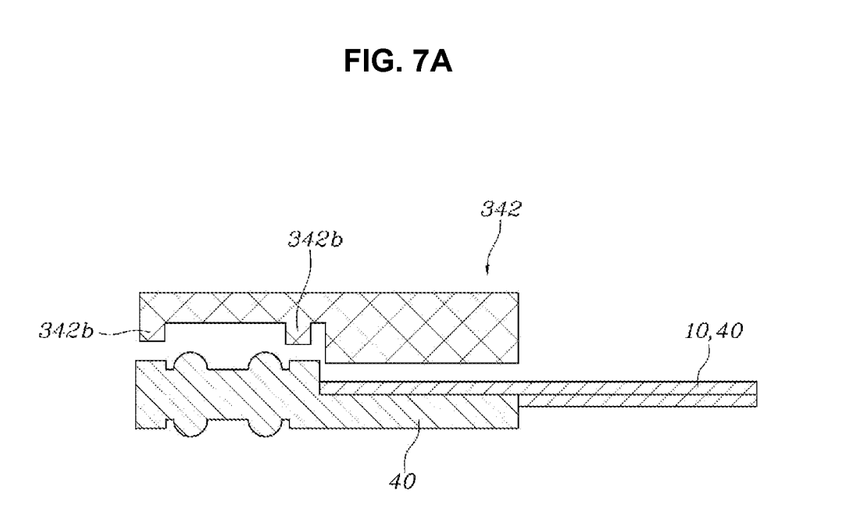

Meanwhile, as shown in FIG. 7A, a second contact portion 342b may be formed so that the second heating portion 342 directly contacts with the elastomeric frame 40 in the remaining areas except for the long-axis overlapping area 40a when the second heating portion 342 provides heat and pressure to the long-axis overlapping area 40a to detect the surface pressure pressed to the long-axis overlapping area 40a by measuring the load applied to the elastomeric frame 40 by the second contact portion 342b when the second heating portion 342 presses the long-axis overlapping area 40a.

Figure 7B:
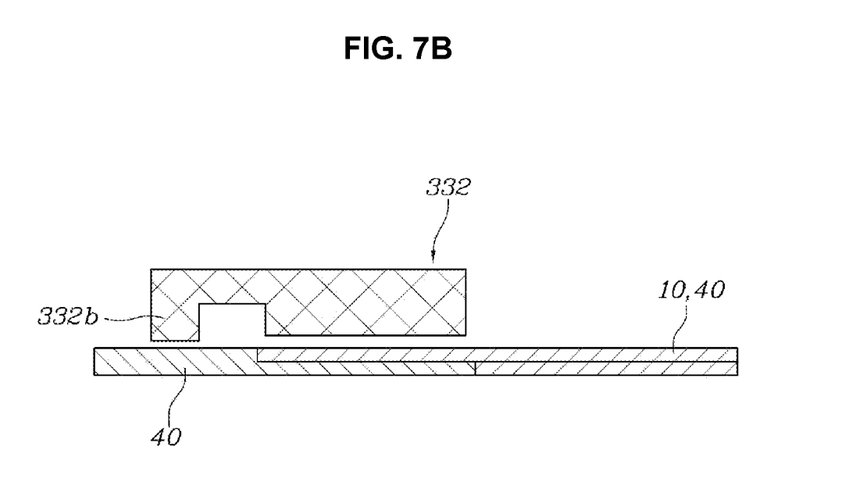

Furthermore, as shown in FIG. 7B, a first contact portion 332b may be formed so that the first heating portion 332 directly contacts with the elastomeric frame 40 in the remaining areas except for the short-axis overlapping area 40b when the first heating portion 332 provides heat and pressure to the short-axis overlapping area 40b to detect the surface pressure pressed to the short-axis overlapping area 40b by measuring the load applied to the elastomeric frame 40 by the first contact portion 332b when the first heating portion 332 presses the short-axis overlapping area 40b.

Accordingly, the surface pressure pressed to the long-axis overlapping area 40a and the surface pressure pressed to the short-axis overlapping area 40b may be compared to each other to control the movement amounts of the second moving shaft 312 and the first moving shaft 311, respectively so that the same surface pressure as each other is provided thereto.

The lower jig module 400 is a module on which the insert 10 and the elastomeric frame 40 are accommodated for thermal bonding between the insert 10 and the elastomeric frame 40, and mounted on the upper surface of the base plate 100. Accordingly, the lower jig module 400 has the elastomeric frame 40 and the insert 10 sequentially accommodated. Accordingly, the upper surface of the lower jig module 400 is implemented in the shape corresponding to the shape of the lower surface of the elastomeric frame 40. For example, the upper surface of the lower jig module 400 is formed by corresponding to the overall shape of the elastomeric frame 20 and the shape of the sealing protrusion 41.

A seating groove 410 corresponding to the shape of the elastomeric frame 40 is formed on the upper surface of the lower jig module 400. At the instant time, a sealing groove 411 corresponding to the sealing protrusion 41 of the elastomeric frame 40 may be formed in the seating groove 410, and a through protrusion 412 corresponding to the through hole 42 of the elastomeric frame 40 may be formed.

Next, a method for manufacturing an elastomeric cell frame by use of the apparatus of manufacturing the elastomeric cell frame for the fuel cell according to an exemplary embodiment of the present invention configured as described above will be described.

First, the insert 10 and the elastomeric frame 40 are overlapped and accommodated in the seating groove 410 of the lower jig module 400. At the instant time, the elastomeric frame 40 is accommodated in the seating groove 410 of the lower jig module 400 in an easily aligned state as the sealing protrusion 41 and the through hole 42 are mounted by corresponding to the sealing groove 411 and the through protrusion 412 formed on the lower jig module 400.

As described above, when the insert 10 and the elastomeric frame 40 are accommodated in a stable posture in the lower jig module 400, the power portion 350 is operated to advance the first moving shaft 311 and the second moving shaft 312 toward the lower jig module 400. At the instant time, the first heating portion 332 and the second heating portion 342 is heated by receiving heat. When the first moving shaft 311 and the second moving shaft 312 continuously advance, the first heating portion 332 and the second heating portion 342 face the short-axis overlapping area 40b and the long-axis overlapping area 40a, respectively, and press the short-axis overlapping area 40b and the long-axis overlapping area 40a while providing heat thereto by the continuous advance.

Accordingly, the elastomeric frame 40 is melted by the heat provided and thermally bonded at the interface with the insert 10. At the instant time, as the movement amounts of the first moving shaft 311 and the second moving shaft 312 are separately controlled, respectively, the amounts of heat and pressure provided to the short-axis overlapping area 40b and the long-axis overlapping area 40a are controlled separately. As described above, as the amounts of heat and pressure provided to the short-axis overlapping area 40b and the long-axis overlapping area 40a are controlled separately, the same surface pressure may be provided even if the thicknesses of the short-axis overlapping area 40b and the long-axis overlapping area 40a are different from each other, such that the insert 10 and the elastomeric frame 40 may be thermally bonded to be integrated uniformly in the short-axis overlapping area 40*b* and the long-axis overlapping area 40*a* having the thicknesses different from each other.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of manufacturing an elastomeric cell frame for a fuel cell, the apparatus comprising:
   as the apparatus of manufacturing the elastomeric cell frame including an insert in which a membrane electrode assembly and a gas diffusion layer have been bonded, and a sheet-like elastomeric frame made of a thermoplastic elastomer (TPE) integrated into an external area of the insert to form a unit cell of the fuel cell,
   a lower jig module, wherein an overlapping area, in which the insert and the sheet-like elastomeric frame overlap at a predetermined area, is accommodated; and
   an upper jig module mounted above the lower jig module to provide heat and pressure to the overlapping area to thermally bond an interface between the insert and the sheet-like elastomeric frame in the overlapping area,
   wherein the upper jig module includes:
      a moving shaft moving forwards from or backwards toward the lower jig module;
      an upper jig mounted at a first end portion of the moving shaft to provide the heat and the pressure while facing the overlapping area; and
      a power portion mounted at a second end portion of the moving shaft to provide power to forward or backward operation of the moving shaft,
   wherein the overlapping area includes a short-axis overlapping area formed on a short-axis portion of the sheet-like elastomeric frame, and a long-axis overlapping area formed on a long-axis portion of the sheet-like elastomeric frame,
   wherein the upper jig includes a first upper jig for providing heat and pressure to the short-axis overlapping area, and a second upper jig for providing heat and pressure to the long-axis overlapping area, and
   wherein the moving shaft includes a first moving shaft coupled to the first upper jig for moving the first upper jig, and a second moving shaft coupled to the second upper jig for moving the second upper jig.

2. The apparatus of manufacturing the elastomeric cell frame for the fuel cell according to claim 1,
   wherein the first upper jig includes a first main body portion connected to the first moving shaft, and a first heating portion protruded toward the lower jig module on a surface of the first main body portion to provide heat and pressure while directly facing the short-axis overlapping area, and
   wherein the second upper jig includes a second main body portion connected to the second moving shaft, and a second heating portion protruded toward the lower jig module on a surface of the second main body portion to provide heat and pressure while directly facing the long-axis overlapping area.

3. The apparatus of manufacturing the elastomeric cell frame for the fuel cell according to claim 2,
   wherein the first moving shaft is formed in a pipe having a hollow formed through a first end portion and a second end portion of the first moving shaft, and the second moving shaft is slidably mounted by penetrating an interior of the first moving shaft, and
   wherein the second main body portion of the second upper jig is mounted further toward the lower jig module than the first main body portion of the first upper jig, and the first heating portion of the first upper jig protrudes further toward the lower jig module than the second heating portion of the second upper jig.

4. The apparatus of manufacturing the elastomeric cell frame for the fuel cell according to claim 2,
   wherein the first heating portion and the second heating portion are made of a material having a thermal conductivity higher than a thermal conductivity of the first main body portion and the second main body portion.

5. The apparatus of manufacturing the elastomeric cell frame for the fuel cell according to claim 1,
   wherein the power portion independently operates whether to move the first moving shaft and the second moving shaft and movement amounts of the first moving shaft and the second moving shaft, respectively.

6. The apparatus of manufacturing the elastomeric cell frame for the fuel cell according to claim 1, further including
   a base plate in which the lower jig module is accommodated; and
   a support module mounted on the base plate to support so that the upper jig module is mounted above the lower jig module.

7. The apparatus of manufacturing the elastomeric cell frame for the fuel cell according to claim 1,
   wherein a seating groove corresponding to a shape of the sheet-like elastomeric frame is formed on an upper surface of the lower jig module.

8. The apparatus of manufacturing the elastomeric cell frame for the fuel cell according to claim 7,
   wherein a sealing groove corresponding to a sealing protrusion of the sheet-like elastomeric frame is formed in the seating groove.

9. The apparatus of manufacturing the elastomeric cell frame for the fuel cell according to claim 1,
   wherein a through protrusion corresponding to a through hole of the sheet-like elastomeric frame is formed on an upper surface of the lower jig module.

10. The apparatus of manufacturing the elastomeric cell frame for the fuel cell according to claim 2,
    wherein the first upper jig includes a first non-contact portion formed so that the first heating portion does not directly contact with the elastomeric frame in the remaining areas except for the short-axis overlapping area, wherein the second upper jig includes a second non-contact portion formed so that the second heating portion does not directly contact with the elastomeric frame in the remaining areas except for the long-axis overlapping area.

11. The apparatus of manufacturing the elastomeric cell frame for the fuel cell according to claim 2,
wherein the first upper jig includes a first contact portion formed so that the first heating portion directly contacts with the elastomeric frame in the remaining areas except for the short-axis overlapping area,
wherein the second upper jig includes a second contact portion formed so that the second heating portion directly contacts with the elastomeric frame in the remaining areas except for the long-axis overlapping area.

12. An apparatus of manufacturing an elastomeric cell frame for a fuel cell, the apparatus comprising:
as the apparatus of manufacturing the elastomeric cell frame including an insert in which a membrane electrode assembly and a gas diffusion layer have been bonded, and a sheet-like elastomeric frame made of a thermoplastic elastomer (TPE) integrated into an external area of the insert to form a unit cell of the fuel cell,
a lower jig module, wherein an overlapping area, in which the insert and the sheet-like elastomeric frame overlap at a predetermined area, is accommodated; and
an upper jig module mounted above the lower jig module to provide heat and pressure to the overlapping area to thermally bond an interface between the insert and the sheet-like elastomeric frame in the overlapping area,
wherein a seating groove corresponding to a shape of the sheet-like elastomeric frame is formed on an upper surface of the lower jig module.

13. The apparatus of manufacturing the elastomeric cell frame for the fuel cell according to claim 12,
wherein a sealing groove corresponding to a sealing protrusion of the sheet-like elastomeric frame is formed in the seating groove.

14. The apparatus of manufacturing the elastomeric cell frame for the fuel cell according to claim 12,
wherein a through protrusion corresponding to a through hole of the sheet-like elastomeric frame is formed on an upper surface of the lower jig module.

15. The apparatus of manufacturing the elastomeric cell frame for the fuel cell according to claim 12, further including
a base plate in which the lower jig module is accommodated; and
a support module mounted on the base plate to support so that the upper jig module is mounted above the lower jig module.

16. The apparatus of manufacturing the elastomeric cell frame for the fuel cell according to claim 12, wherein the upper jig module includes:
a moving shaft moving forwards from or backwards toward the lower jig module;
an upper jig mounted at a first end portion of the moving shaft to provide the heat and the pressure while facing the overlapping area; and
a power portion mounted at a second end portion of the moving shaft to provide power to forward or backward operation of the moving shaft.

17. The apparatus of manufacturing the elastomeric cell frame for the fuel cell according to claim 16,
wherein the overlapping area includes a short-axis overlapping area formed on a short-axis portion of the sheet-like elastomeric frame, and a long-axis overlapping area formed on a long-axis portion of the sheet-like elastomeric frame,
wherein the upper jig includes a first upper jig for providing heat and pressure to the short-axis overlapping area, and a second upper jig for providing heat and pressure to the long-axis overlapping area, and
wherein the moving shaft includes a first moving shaft coupled to the first upper jig for moving the first upper jig, and a second moving shaft coupled to the second upper jig for moving the second upper jig.

18. The apparatus of manufacturing the elastomeric cell frame for the fuel cell according to claim 17,
wherein the first upper jig includes a first main body portion connected to the first moving shaft, and a first heating portion protruded toward the lower jig module on a surface of the first main body portion to provide heat and pressure while directly facing the short-axis overlapping area, and
wherein the second upper jig includes a second main body portion connected to the second moving shaft, and a second heating portion protruded toward the lower jig module on a surface of the second main body portion to provide heat and pressure while directly facing the long-axis overlapping area.

19. The apparatus of manufacturing the elastomeric cell frame for the fuel cell according to claim 17,
wherein the power portion independently operates whether to move the first moving shaft and the second moving shaft and movement amounts of the first moving shaft and the second moving shaft, respectively.

* * * * *